Figure 1:
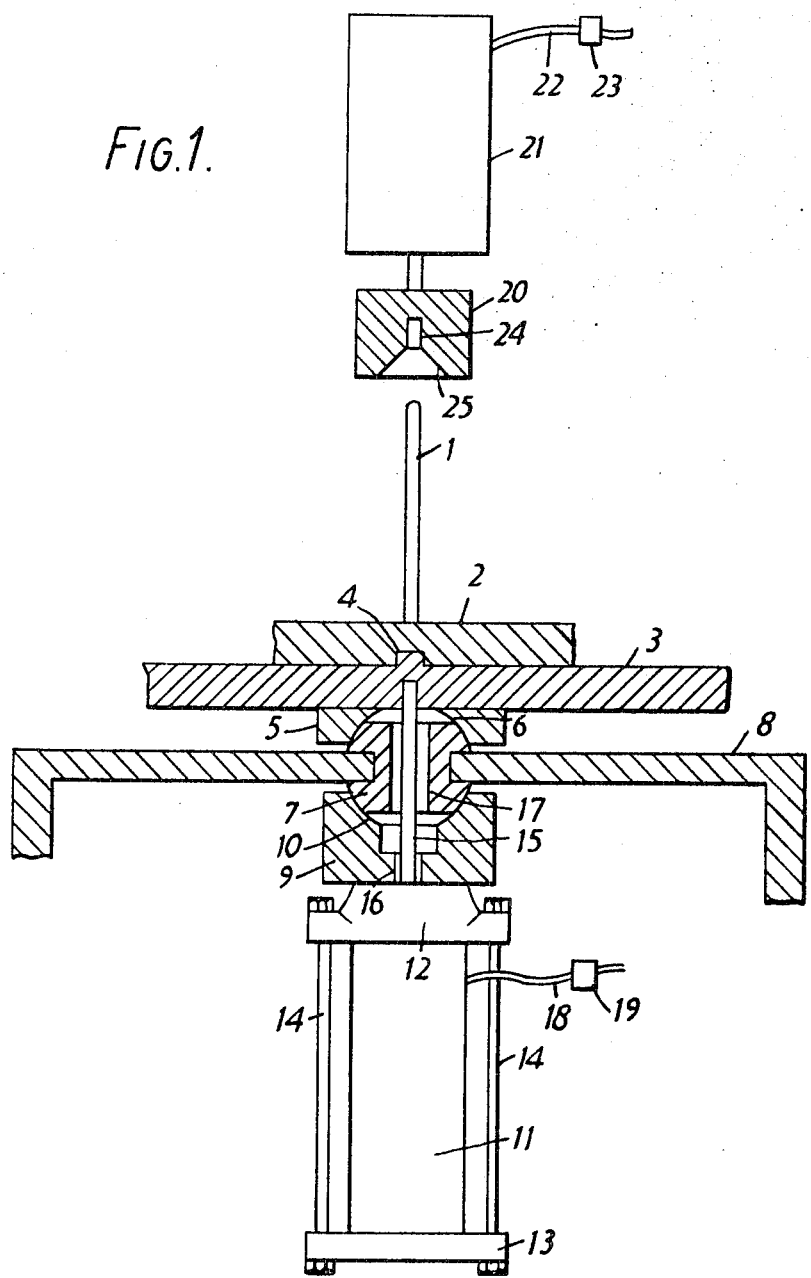

United States Patent
Rand et al.

[15] 3,657,787
[45] Apr. 25, 1972

[54] ARRANGEMENTS FOR POSITIONING SPINDLES

[72] Inventors: Walter Leslie Rand, Gerrards; John Ernest Simmons, Ruislip, both of England

[73] Assignee: Electric & Musical Industries Limited, Hayes, Middlesex, England

[22] Filed: Mar. 27, 1970

[21] Appl. No.: 23,429

[52] U.S. Cl. ............................................................. 29/200 P
[51] Int. Cl. ........................................................ B23p 19/00
[58] Field of Search .................. 29/200 P, 200 J, 200 R, 203 P

[56] References Cited

UNITED STATES PATENTS 3,377,685   4/1968   Carlstedt ............................ 29/200 P
3,447,223   6/1969   Brown .................................. 29/200 P Primary Examiner—Thomas H. Eager
Attorney—William W. Downing, Jr.

[57] ABSTRACT

An arrangement is disclosed for positioning a spindle protruding from a base member. The base is located on a support member which can tilt about lockable spherical bearing means. In operation, the bearing means is unlocked and the spindle adjusted to its desired position and then the bearing means is locked to hold the spindle in its adjusted position. Also disclosed is the application of this arrangement to the stacking of gramophone records.

8 Claims, 2 Drawing Figures

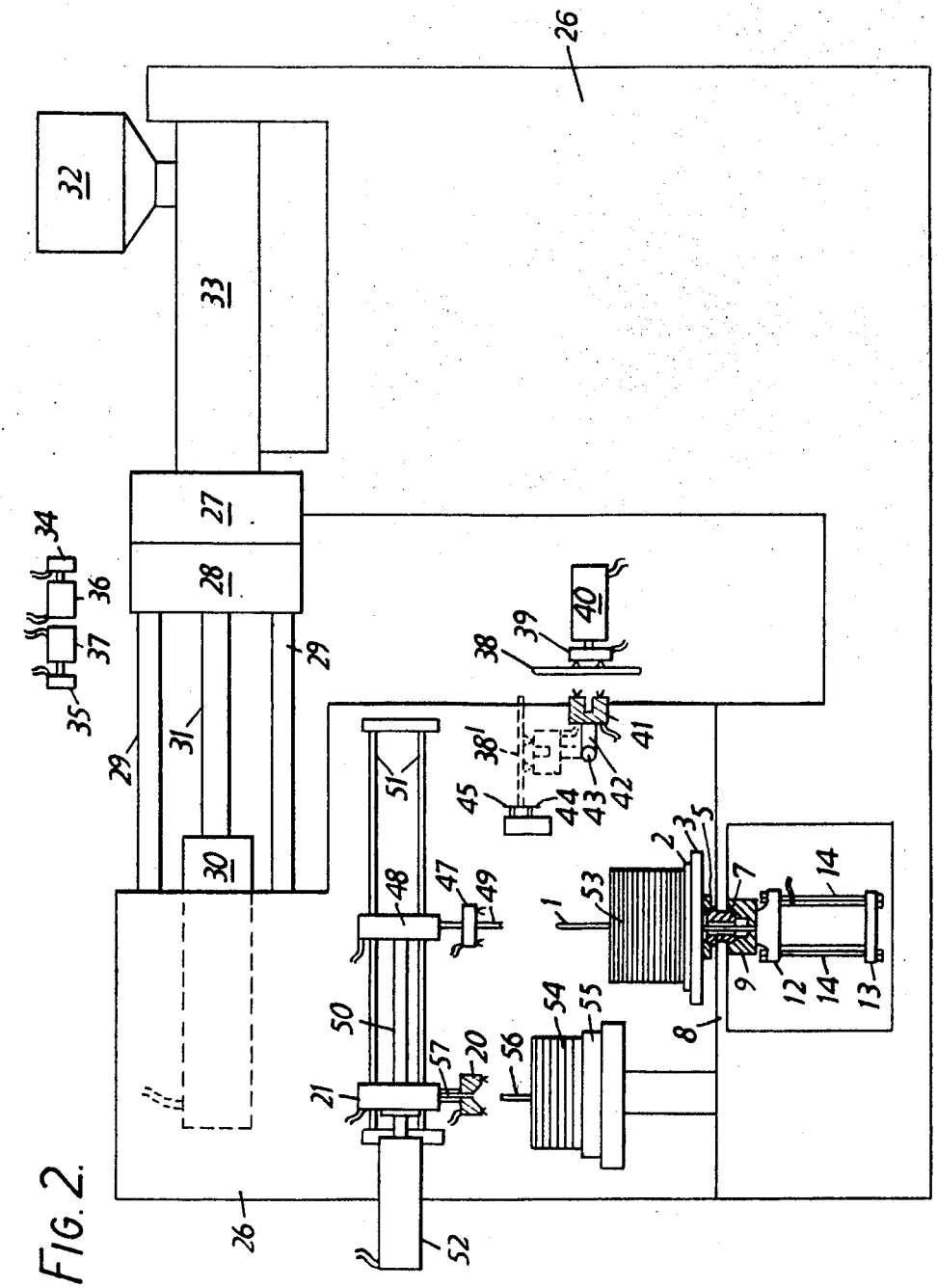

ARRANGEMENTS FOR POSITIONING SPINDLES

This invention relates to arrangements for positioning spindles and the like, especially but not exclusively for use with automatic machines for manufacturing gramophone records.

In the production of gramophone records, a final operation may involve the inspection and bagging of the records, and as this may occur at a location some distance from the record press it is necessary to provide means for transporting the records. Usually the records are stacked onto a carrier which comprises a flat base plate having an upstanding spindle normal thereto over which pass the central holes in the records. In use the spindle can become slightly displaced from the normal. When the carrier is automatically loaded with records at the press, even a slight deviation of the spindle from the normal results in damage to the records because the tip of the spindle no longer aligns with the central holes in the records.

It is an object of the invention to provide an arrangement whereby a spindle can readily be adjusted to a desired position.

According to the invention there is provided an arrangement for positioning a spindle comprising a support for locating a member including a projecting spindle, a joint allowing tilting movements of said support, means for locking said joint and means operative on said spindle when supported by said support to adjust it to the desired position while the joint is freely movable, the arrangement being such that after adjustment of the spindle the joint is locked to hold the spindle in its adjusted position so long as it is located on said support.

It is intended that the term spindle used herein shall mean any projecting member, and especially but not exclusively a solid or hollow rod-like body which is employed for the threading thereover of apertured articles.

In order that the invention may be clearly understood and readily carried into effect it will now be described with reference to the accompanying drawings, of which:

FIG. 1 illustrates diagrammatically partly in cross-section an arrangement according to the invention, and FIG. 2 illustrates diagrammatically partly in cross-section its application to the automatic production of gramophone records.

Referring to FIG. 1, a spindle 1 is carried at its lower end by a member 2. The member 2 is located or indexed by a stud 4 on a support 3. A collar 5 secured to support 3 and having a spherical surface 6 co-operating with the upper surface of a spherical bearing member 7 allows some universal tilting movement of the support 3. Bearing member 7 is secured in an aperture in a table or like fixed member 8. A cup-like member 9 has a spherical surface 10 co-operating with the lower surface of bearing member 7. An air cylinder 11 is clamped between plates 12 and 13 by bolts 14 and plate 12 is secured to the cup 9. The operating arm 15 of air cylinder 11 passes through aperture 16 in cup 9 and aperture 17 in bearing member 7 and is secured to support 3. The aperture 17 is dimensioned so as to allow some universal tilting movement of support 3 and the concomitant tilting of air cylinder 11. The air cylinder 11 is operated through air line 18 and a solenoid-operated valve 19. Above the spindle 1 a positioning head 20 is carried by the operating arm of an air cylinder 21 which is operated through air line 22 and a solenoid-operated valve 23. The head 20 has a positioning recess 24 having a conical lead-in surface 25.

When a fresh member 2 carrying a spindle 1 is placed on support 3 and indexed by means of stud 4, a positioning cycle is initiated by electrical control means (not shown). The positioning cycle comprises the following sequence of operations:

i. solenoid operated valve 19 operates to connect air cylinder 11 to atmosphere, previously having been connected through the valve 19 to a pressurized air supply. This releases the grip exerted by the parts 5 and 9 on the spherical bearing member 7 and allows some universal tilting movement of support 3 and hence spindle 1, ii. solenoid operated valve 23 operates to connect air cylinder 21 to a pressurized air supply, thus lowering the positioning head 20. When the displacement, if any, of spindle 1 relative to its member 2 is different from that of the previous spindle and its member, then the upper end of the spindle will contact lead-in surface 25 and be guided thereby to the positioning recess 24 to adjust it to the desired position. The unlocked condition of the spherical bearing allows the upper end of spindle 1 to be guided into the positioning recess 24 by allowing tilting of support 3 and the concomitant tilting of air cylinder 11 and its supporting structure. The position and stroke of air cylinder 21 is such that when the head 20 is in its fully lowered position, the top of spindle 1 just enters recess 24, iii. valve 19 operates to connect the air cylinder 11 to a source of pressurized air, thus retracting the arm 15 and locking the members 5 and 9 against the spherical bearing member 7, and iv. valve 23 operates to connect the air cylinder 21 to atmosphere thus raising the head 20 away from the spindle 1.

The air cylinder 11 remains connected to the source of pressurized air until the next positioning cycle is initiated, so maintaining the spindle 1 in its adjusted position with its tip at an accurately defined point.

Referring now to FIG. 2, a frame or bed 26 supports an injection moulding machine and its associated apparatus for making gramophone records. The machine comprises a fixed mould half 27 and a movable mould half 28 which runs on guides 29 under the influence of an air cylinder 30 and its operating arm 31. A hopper 32 supplies record material in powder or granular form to heater and feeder 33.

Suction heads 34 and 35 carried respectively by vertically reciprocable air cylinders 36 and 37 each transfer a record label from a supply to the separated mould halves 27 and 28 where they are retained by suction means.

When the mould opens, suitable means are used to ensure that the record remains on the moving mould half 28. An air cylinder 40 is vertically and horizontally reciprocable by other air cylinder means which are not shown for the sake of clarity. The operating arm of air cylinder 40 carries a suction head 39 which transfers a record 38 from the mould half 28 to a further suction head 41 carried by an arm 42 which is pivotable about a horizontal axis 43 to bring the record 38 to the position 38' where the flash is trimmed away by co-operating rotary cutters 44 and 45.

Air cylinders 21 and 48 are rigidly connected together by means 50 and they are horizontally reciprocable in unison along guides 51 under the influence of an air cylinder 52. Air cylinder 21 carries a positioning head 20 as described with reference to FIG. 1, but which also includes suction means. The positioning recess 24 of FIG. 1 is extended into the operating arm of the cylinder 21 to form a bore 57 allowing the head 20 to pass over a spindle 56 which carries a stack 54 of interleaving discs on a stand 55. The air cylinder 48 carries a suction head 47 having a depending central pin 49 which passes through the central hole of a gramophone record. The pin 49 locates a gramophone record at 38' during the trimming operation, and also co-operates with spindle 1 when the trimmed record is dropped onto the stack 53. The air cylinder 21 and the suction to head 20 operate, say, every fifth reciprocation to transfer an interleaving disc from stack 54 to the record stack 53.

When a fresh record carrier, comprising a spindle 1 on a member 2, is placed on the support 3 to receive the records, a positioning cycle is initiated to bring the tip of spindle 1 to the correct position so that it will co-operate with pin 49 to receive records therefrom without damaging them. The positioning cycle is initiated by a separate push-button controlled circuit which is operated when the head 20 is above spindle 1. The positioning cycle operates as described with reference to FIG. 1, the same reference numerals being used.

It will be appreciated that although the application described with reference to FIG. 2 is to an injection moulding machine for making gramophone records, the use of the invention is not so limited but may be used with other types of machines where it is required to accurately position the end of a spindle or other rod-like body.

We claim:

1. An arrangement for positioning a spindle comprising a support for locating a member including a projecting spindle, a joint allowing tilting movements of said support, means for locking said joint and means operative on said spindle when supported by said support to adjust it to the desired position while the joint is freely movable, the arrangement being such that after adjustment of the spindle the joint is locked to hold the spindle in its adjusted position so long as it is located on said support.

2. An arrangement according to claim 1 wherein said means operative on said spindle operates on the free end thereof.

3. An arrangement according to claim 1 wherein said joint comprises a fixed spherical bearing member and said support includes shaped surface portions co-operating therewith.

4. An arrangement according to claim 3 wherein the locking means is operable to press said shaped surface portions against said bearing member.

5. An arrangement according to claim 4 wherein the locking means comprises pneumatic actuating means.

6. An arrangement according to claim 1 wherein the means operative on the spindle comprises pneumatic actuating means having an operative member including means engageable with said spindle to adjust it to the desired position.

7. Apparatus for positioning and securing a spindle projecting from a base member comprising a support for locating said base member, a joint allowing tilting movements of said support, means for locking said joint and means operative on said spindle when said base member is located by said support to adjust said spindle to the desired position while the joint is freely movable, the arrangement being such that after adjustment of said spindle the joint is locked to hold said spindle in its adjusted position so long as said base member is located by said support.

8. Apparatus according to claim 7 including first and second carriers mounted on a reciprocating member movable between one position in which the first carrier is above a gramophone record delivery station and the second carrier is above said support, and another position in which said first carrier is above said support and said second carrier is above a spacer delivery station, said second carrier constituting the adjusting means operative on said spindle.

* * * * *